(12) United States Patent
Oota

(10) Patent No.: US 8,670,623 B2
(45) Date of Patent: Mar. 11, 2014

(54) IMAGE PROCESSING APPARATUS, IMAGE CONVERSION METHOD, AND COMPUTER-READABLE STORAGE MEDIUM FOR COMPUTER PROGRAM BASED ON CALCULATED DEGREE OF COMPLEXITY

(75) Inventor: Yuko Oota, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1246 days.

(21) Appl. No.: 12/406,225

(22) Filed: Mar. 18, 2009

(65) Prior Publication Data

US 2009/0310868 A1 Dec. 17, 2009

(30) Foreign Application Priority Data

Jun. 11, 2008 (JP) ................................. 2008-153125

(51) Int. Cl.
*G06K 9/48* (2006.01)
(52) U.S. Cl.
USPC ........... 382/200; 382/198; 382/199; 382/232; 382/241; 382/242
(58) Field of Classification Search
USPC ......... 382/177, 182, 185–187, 190, 198–203, 382/232, 241, 242, 244, 253
See application file for complete search history.

(56) References Cited

U.S. PATENT DOCUMENTS 5,214,718 A * 5/1993 Khosla .......................... 382/166
5,438,656 A * 8/1995 Valdes et al. ................... 345/443

(Continued)

FOREIGN PATENT DOCUMENTS

JP 02-064877 3/1990
JP 05-290159 11/1993

(Continued)

OTHER PUBLICATIONS

Notification of Reason(s) for Refusal issued in the corresponding Japanese Patent Application No. 2008-153125 dated Apr. 27, 2010, and an English Translation thereof.

*Primary Examiner* — Eric Rush
(74) *Attorney, Agent, or Firm* — Buchanan Ingersoll & Rooney PC

(57) ABSTRACT

There are provided a labeling portion that extracts a character included in raster format image data, a complexity calculation portion that obtains a degree of complexity indicating complexity of the character, an approximation method determination portion that determines whether or not to use curve approximation to convert the character based on the degree of complexity thus obtained. In the case where it has been determined to use the curve approximation, the character is converted into a vector format by performing straight-line approximation or curve approximation on each part of a contour of the character, whereas in the case where it has been determined not to use the curve approximation, the character is converted into a vector format by performing the straight-line approximation on each part of the contour of the character without performing the curve approximation.

6 Claims, 19 Drawing Sheets

(56) References Cited

U.S. PATENT DOCUMENTS

| | | | |
|---|---|---|---|
| 5,644,654 A * | 7/1997 | Onokera | 382/199 |
| 6,288,725 B1 * | 9/2001 | Fu | 345/467 |
| 7,002,597 B2 * | 2/2006 | Arnold et al. | 382/269 |
| 7,251,365 B2 * | 7/2007 | Fux et al. | 382/185 |
| 7,639,259 B2 * | 12/2009 | Achong et al. | 345/471 |
| 2005/0238244 A1 | 10/2005 | Uzawa | |
| 2006/0192781 A1 * | 8/2006 | Iwata et al. | 345/467 |
| 2007/0206867 A1 * | 9/2007 | Tamura et al. | 382/232 |
| 2007/0229506 A1 * | 10/2007 | Sugita et al. | 345/441 |
| 2007/0262992 A1 * | 11/2007 | Ito | 345/467 |

FOREIGN PATENT DOCUMENTS

| | | |
|---|---|---|
| JP | 10-143654 | 5/1998 |
| JP | 2005-346137 | 12/2005 |
| JP | 2007-129557 A | 5/2007 |
| JP | 2007-272335 | 10/2007 |

* cited by examiner

KMD q,···9,38,S,24,38,S,24,31,S,9,28,S,9,21,S,14,21,S,16,26,S,24,26,S,24,16,S,2,16,
S,0,12,S,4,9,S,7,14,S,24,14,S,24,4,S,19,4,S,19,0,S,31,2,S,28,12,S,45,9,S,45,14,
S,40,16,S,31,16,S,45,26,S,43,28,S,28,28,S,28,38,S,33,40,S,43,40,S,48,48,S,45,
50,S,28,45,S,28,50,S,21,52,S,12,52,S,4,43,S,x,x,Q

FIG. 13B

KMD q,···0,45,S,0,42,S,0,40,3,34,7,28,C,14,19,S,2,21,S,0,16,S,12,16,S,12,10,S,12,7,
11,3,9,2,C,7,0,S,19,0,S,19,16,S,21,16,S,24,12,S,43,9,S,40,40,S,44,40,S,46,40,
49,38,51,36,C,55,31,S,55,34,S,55,36,54,40,52,42,C,50,45,S,36,45,S,36,14,S28,
18,S,24,19,21,22,20,22,C,19,23,19,28,19,36,C,19,43,18,48,18,49,C,16,50,S,9,
43,S,x,x,Q

IMAGE PROCESSING APPARATUS, IMAGE CONVERSION METHOD, AND COMPUTER-READABLE STORAGE MEDIUM FOR COMPUTER PROGRAM BASED ON CALCULATED DEGREE OF COMPLEXITY

This application is based on Japanese Patent Application No. 2008-153125 filed on Jun. 11, 2008, the contents of which are hereby incorporated by reference.

BACKGROUND OF THE INVENTION

1. Field of the Invention

The present invention relates to an image processing apparatus and a conversion method thereof for converting image data read by a scanner into a vector format.

2. Description of Related Art

It has recently become common to scan paper documents using a scanner and store the scanned documents in digitized form. The documents thus scanned by the scanner are stored, for example, as image data in bitmap format.

The bitmap format expresses characters as a group of dots (pixels), and thus it is not necessary to perform complex calculations when displaying or printing those characters. However, the bitmap format has a disadvantage in that "jaggies" (aliasing artifacts) may be noticeably visible in the contours of the characters displayed or printed depending on the resolution of the apparatus (output apparatus) that outputs (displays or prints) the characters.

A process called "outlining" has therefore been conventionally performed so as to convert bitmap images into vector font images (vector images).

In a vector image, a character is reproduced by forming contour lines by approximating the contours of the character to straight lines and curved lines and then filling in the regions surrounded by those contour lines, which renders jaggies less apparent. Furthermore, because the outputted result does not depend on the resolution of the output apparatus, the image quality of character portions can be stabilized easily even if the output apparatus changes. However, it is necessary to increase the number of points (contour points) used to reproduce the contours of a character in order to express the character as accurately and smoothly as possible in a vector image. As a result, maintaining the image quality of character portions significantly increases the amount of data.

An image processing apparatus has been proposed as conventional technology regarding vector images (JP-2007-129557-A).

According to the image processing apparatus in JP-2007-129557-A, image data obtained by scanning a document is divided according to attributes such as character size, font, color, and outlining is performed according to each piece of data into which the image data is divided.

However, as described above, there are situations where converting the image to a vector image increases the overall amount of image data. The number of contour points increases particularly with characters that have complex shapes, and thus the increase in the data amount is especially prominent in cases where such characters are numerous. Although reducing the number of contour points can be considered in such a case, doing so risks altering the shape of the character, and thus such a method is not favorable.

SUMMARY OF THE INVENTION

In light of the problem described above, it is an object of the present invention to enable the generation of vector images that positively maintain the shape of characters while also having a lower data amount than in the conventional art.

According to one aspect of the present invention, an image processing apparatus is provided with: a character extraction portion extracting a character from raster image data; a complexity calculation portion obtaining a degree of complexity indicating complexity of the character; a determination portion determining, based on the degree of complexity obtained by the complexity calculation portion, whether or not curve approximation is to be used when the character is converted from a raster format to a vector format; and an image conversion portion converting, when the determination portion determines that the curve approximation is to be used, the character from the raster format to the vector format by performing straight-line approximation or the curve approximation on each part of a contour of the character, and converting, when the determination portion determines that the curve approximation is not to be used, the character from the raster format to the vector format by performing the straight-line approximation on each part of the contour of the character without performing the curve approximation thereon.

According to the configuration described above, it is possible to generate vector images that positively maintain the shape of characters while also having a lower data amount than in the conventional art.

BRIEF DESCRIPTION OF THE DRAWINGS

FIGS. 5A and 5B are diagrams illustrating an example of characters expressed by binarized image data.

FIGS. 13A and 13B are diagrams illustrating an example of block data that has undergone approximation processing.

FIGS. 17A and 17B are diagrams illustrating an example of results obtained when an outlining process according to an embodiment of the present invention is carried out on a character having a relatively simple shape.

DESCRIPTION OF THE PREFERRED EMBODIMENTS

Figure 1:
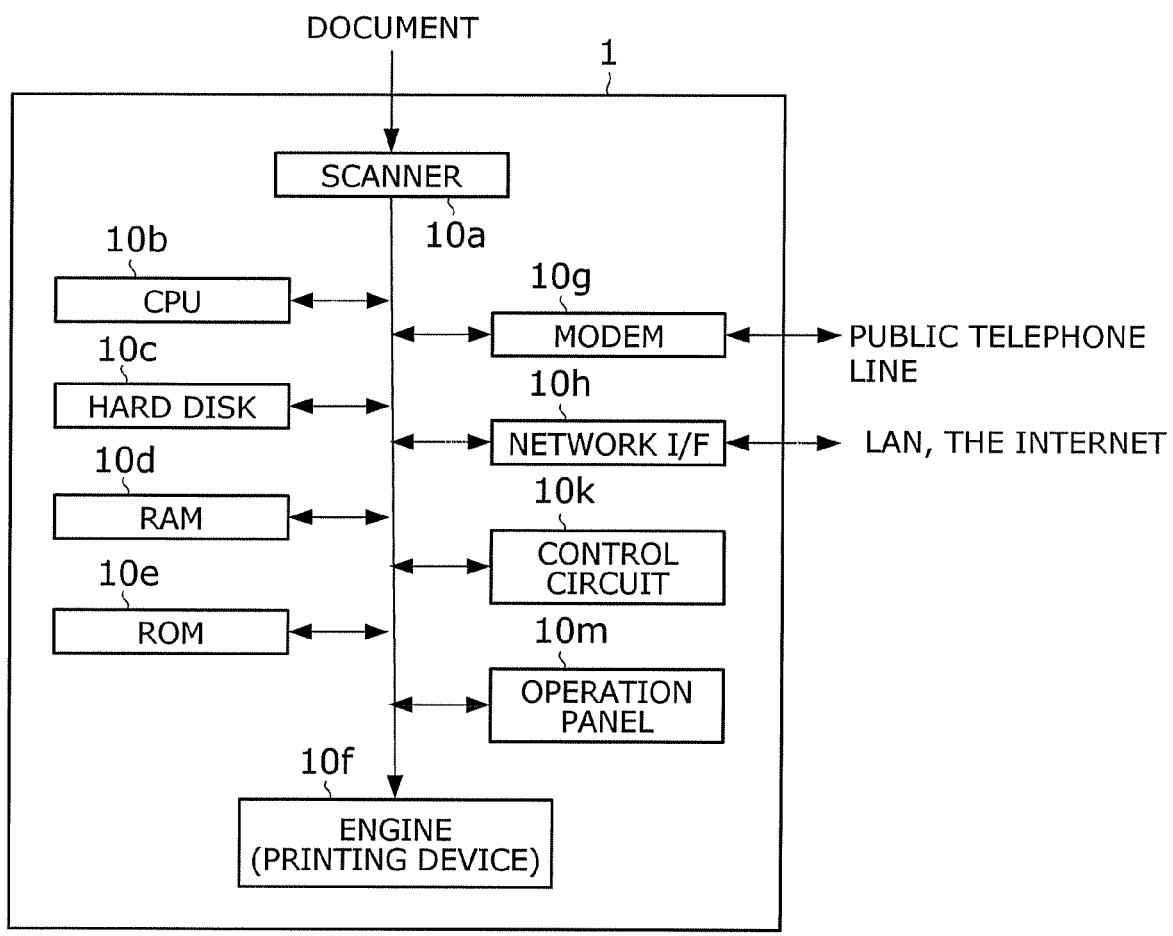
FIG. 1 is a diagram illustrating an example of a hardware configuration of an image forming apparatus according to an embodiment of the present invention.

FIG. 1 is a diagram illustrating an example of a hardware configuration of an image forming apparatus 1 according to an embodiment of the present invention.

The image forming apparatus 1, shown in FIG. 1, is an image processing apparatus that integrates a variety of functions, such as copying, scanning, faxing, network printing, document server functionality, and file transfer functionality. Such apparatuses are also sometimes called combination machine or MFPs (Multi-Function Peripherals).

As shown in FIG. 1, the image forming apparatus 1 is configured of a scanner 10a, a CPU 10b, a hard disk 10c, a RAM 10d, a ROM 10e, a printing device 10f, a modem 10g, a network interface 10h, a control circuit 10k, an operational panel 10m, and so on.

The scanner 10a is a device that optically scans images such as photographs, characters, drawings, and charts that are printed on a paper document (hereinafter, simply referred to as "document") and creates digital data thereof. The scanned image is stored as image data in a format, such as the bitmap format, expressed as RGB (red (R), green (G), and blue (B)). It is also possible to store the image data in the PDF format (Portable Document Format) by specifying that format in advance.

The CPU 10b performs processing for converting the image data of the document scanned by the scanner 10a into a file in a format such as TIFF, JPEG, bitmap, or PDF. The CPU 10b also performs processing for converting image data in the bitmap format (raster format) into a vector format. The CPU 10b also performs overall control of the image forming apparatus 1, such as detecting input from a user, controlling displays made in the operational panel 10m, the creation of e-mail.

The printing device 10f is a device for printing, onto the paper, an image representing the image data scanned by the scanner 10a or an image representing image data sent from another device. In the case where the image forming apparatus 1 is capable of color printing, the printing is performed using four colors of toner, namely, yellow, magenta, cyan, and black.

The operational panel 10m is a device through which the user makes various inputs with respect to the image forming apparatus 1. Using the operational panel 10m, the user can perform various operations, such as selecting the format in which to store image data, setting scanning conditions, inputting commands to start or execute processes, inputting e-mail addresses.

The modem 10g incorporates an NCU (Network Control Unit) and connects to another fax terminal via an analog public line to perform data control and modulation/demodulation of fax data based on a facsimile protocol, and so on.

The network interface 10h is a NIC (Network Interface Card), and is an interface for connecting to another device via a LAN, the Internet, or the like.

The control circuit 10k is a circuit for controlling devices such as the hard disk 10c, the operational panel 10m, the scanner 10a, the printing device 10f, the modem 10g, and the network interface 10h.

The hard disk 10c stores programs, data, and so on for implementing the functions of the various portions described later using FIG. 2. These are read out and stored as necessary in the RAM 10d, and the programs are executed by the CPU 10b. Part or all of these programs or data may be stored in the ROM 10e. Alternatively, some or all of the functions shown in FIG. 2 may be implemented by the control circuit 10k.

Figure 2:
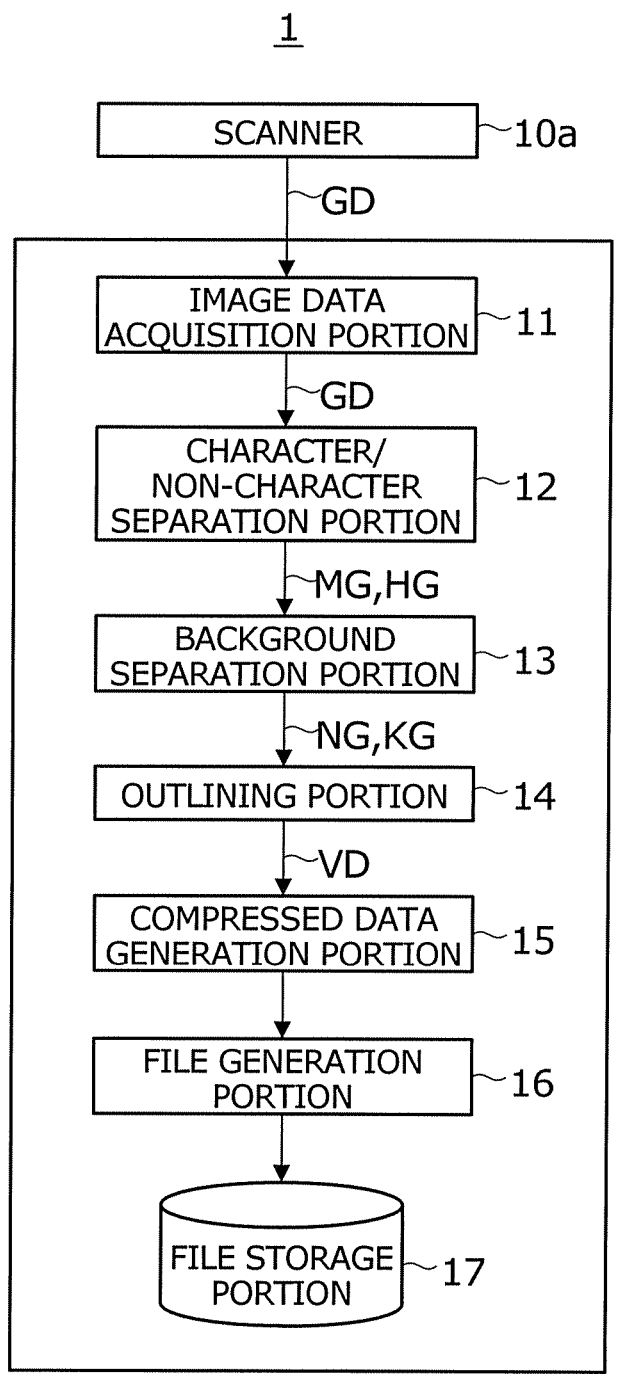
FIG. 2 is a diagram illustrating an example of a functional configuration of the image forming apparatus.
Figure 3:
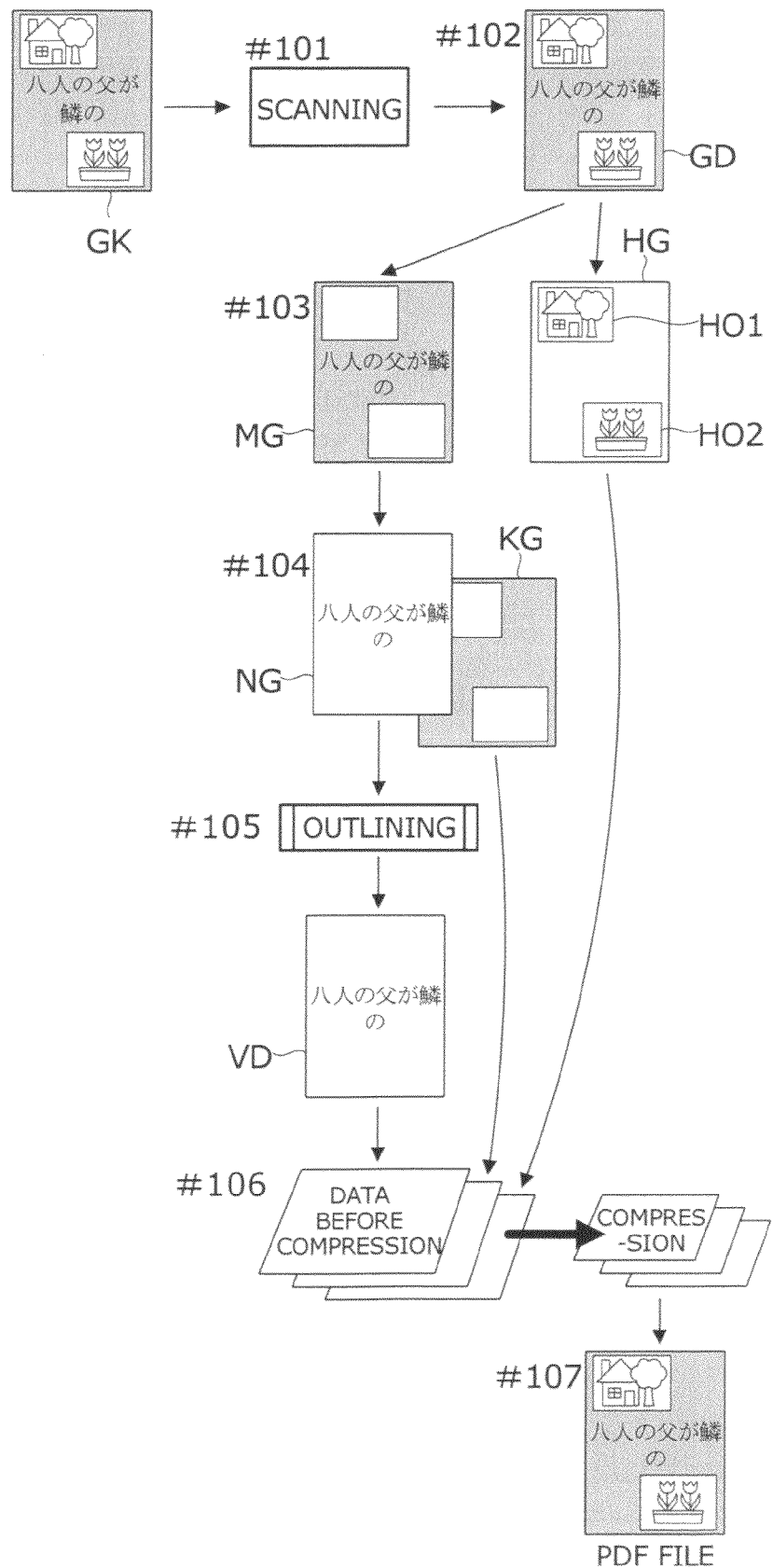
FIG. 3 is a diagram illustrating a flow of image processing performed by the image forming apparatus.

FIG. 2 is a diagram illustrating an example of the functional configuration of the image forming apparatus 1, and FIG. 3 is a diagram illustrating a flow of image processing performed by the image forming apparatus 1.

Next, with reference to FIGS. 2 and 3, a description will be given of processes performed by the various portions of the image forming apparatus 1 when raster format document image data GD obtained by using the scanner 10a to scan a document GK having images including characters and photographs printed thereon is converted into a file in the PDF format and the resultant file is saved.

As shown in FIG. 2, the image forming apparatus 1 is configured of an image data acquisition portion 11, a character/non-character separation portion 12, a background separation portion 13, an outlining portion 14, a compressed data generation portion 15, a file generation portion 16, a file storage portion 17, and so on.

When the user sets the document GK in the scanner 10a, sets the saving format to PDF, and inputs a command to execute the scan, the scanner 10a scans the image of the document GK, and generates raster format document image data GD (#101 in FIG. 3).

The image data acquisition portion 11 then acquires the document image data GD (#102). The character/non-character separation portion 12 performs a process for separating characters included in the document image data GD from non-character objects HO, which are objects aside from characters, such as diagrams, photographs, and charts (#103). This process is carried out using a known method. It is to be noted that, although some characters shown in the illustrations in the embodiments are Japanese, such characters may be of English or any other languages.

Hereinafter, the image data obtained as a result of removing the non-character objects HO from the document image data GD shall be referred to as "first character image data MG". The image data obtained as a result of removing the characters from the document image data GD shall be referred to as "non-character image data HG".

Next, the background separation portion 13 performs a process for separating the characters present in the first character image data MG from the background thereof (#104). This process is performed, for example, by extracting pixels whose darkness value is equal to or greater than a predetermined darkness value as pixels that form the characters. Alternatively, the pixels that form edges may be extracted as pixels that form the characters.

Hereinafter, the image data in which the background has been removed from the first character image data MG shall be referred to as "second character image data NG". Meanwhile, the image data in which the characters have been removed shall be referred to as "background image data KG".

The outlining portion 14 performs an outlining process on the characters present in the second character image data NG, and performs a process for converting the characters expressed in the raster format to characters expressed in the vector format (#105). These processes shall be described in detail later. Hereinafter, the image data obtained by performing the outlining process on the second character image data NG shall be referred to as "vector character image data VD".

The compressed data generation portion 15 generates compressed data for each of the vector character image data VD, the background image data KG, and the non-character image data HG (#106).

To be more specific, the vector character image data VD is compressed using a lossless compression technique such as the Flate method. The background image data KG and the non-character image data HG are first reduced in resolution and are then compressed using a lossy compression technique such as the JPEG system.

The file generation portion 16 generates a file in the PDF format (PDF file) using each piece of the generated compressed data of the vector character image data VD, the background image data KG, and the non-character image data HG. The file storage portion 17 stores the generated PDF file (#107).

Figure 4:
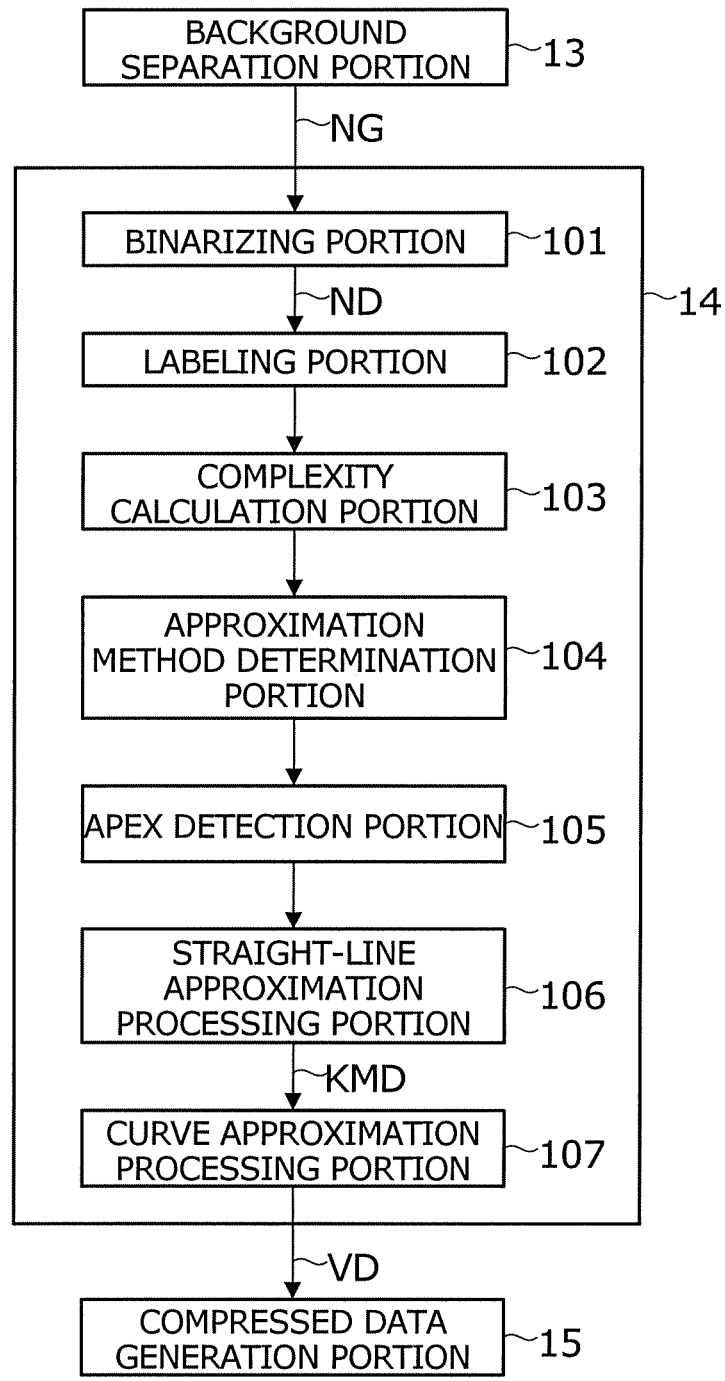
FIG. 4 is a diagram illustrating an example of a configuration of an outlining portion.
Figure 6:
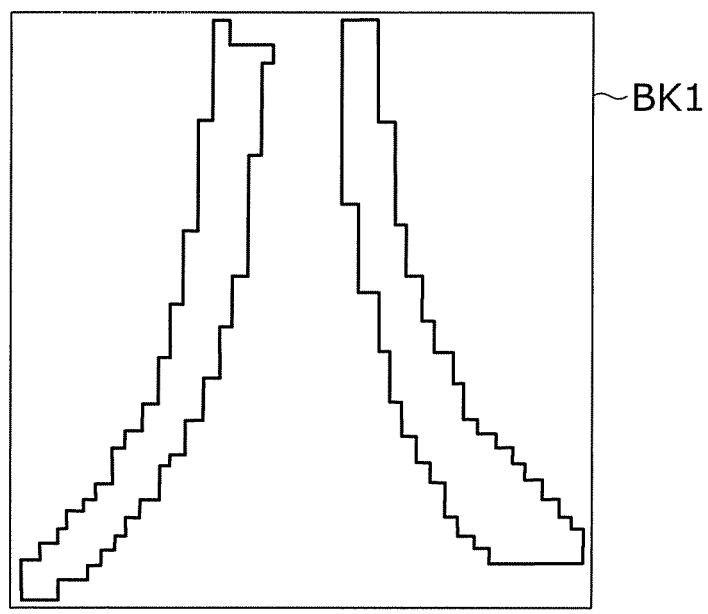
FIG. 6 is a diagram illustrating an example of an image showing edges of a character.
Figure 7:
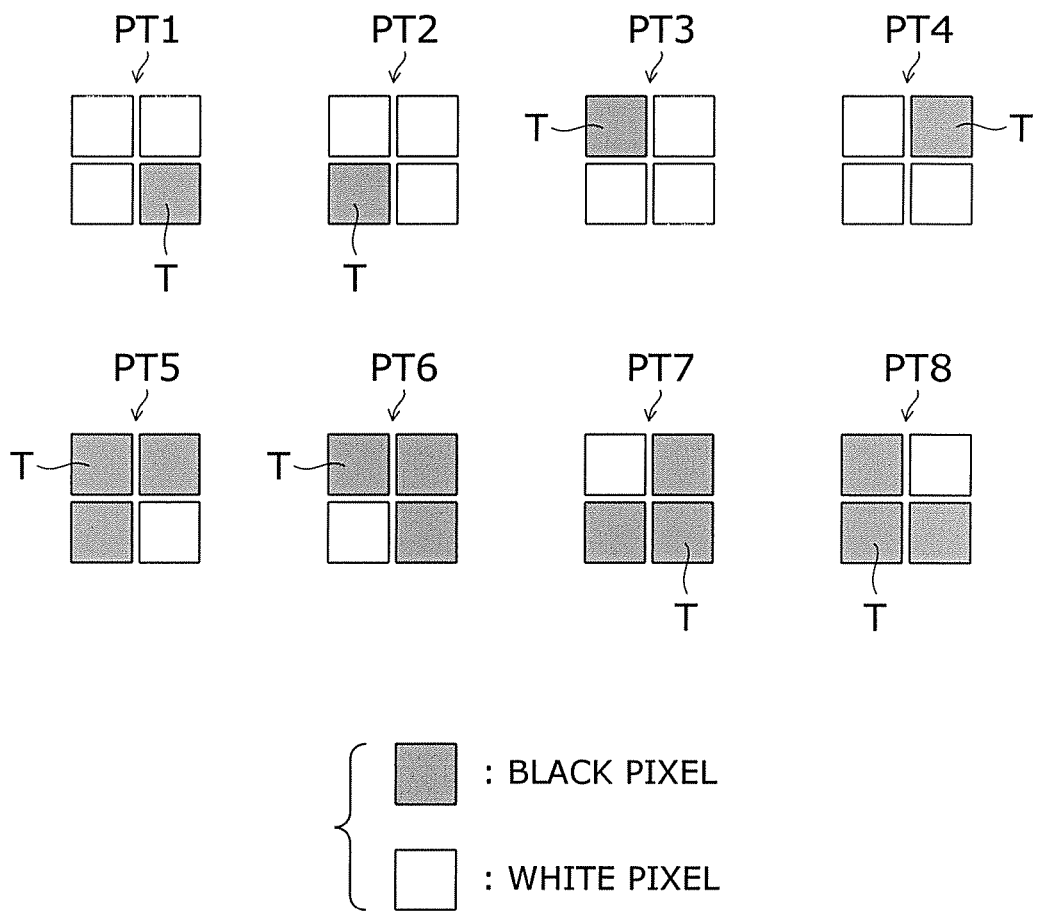
FIG. 7 is a diagram illustrating a pixel arrangement pattern for detecting apex pixels forming contours of a character.
Figure 8A:
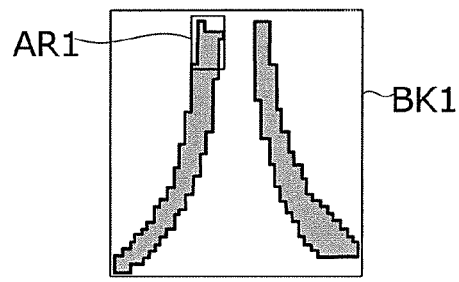
FIGS. 8A, 8B, and 8C are diagrams illustrating a specific example of apex pixel detection.
Figure 8B:
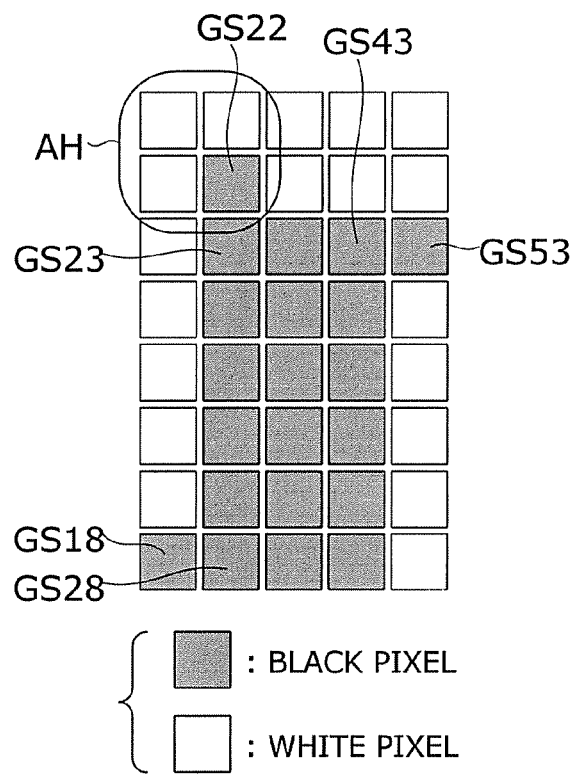
Figure 8C:
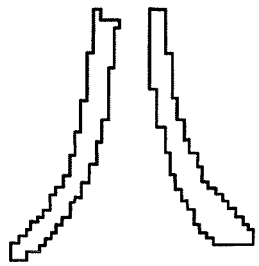
Figure 9A:
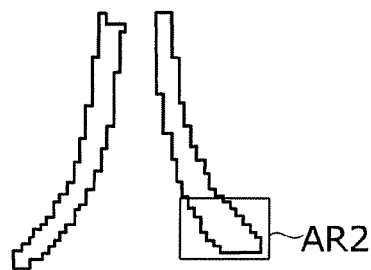
FIGS. 9A, 9B, and 9C are diagrams illustrating a specific example of straight-line approximation.
Figure 9B:
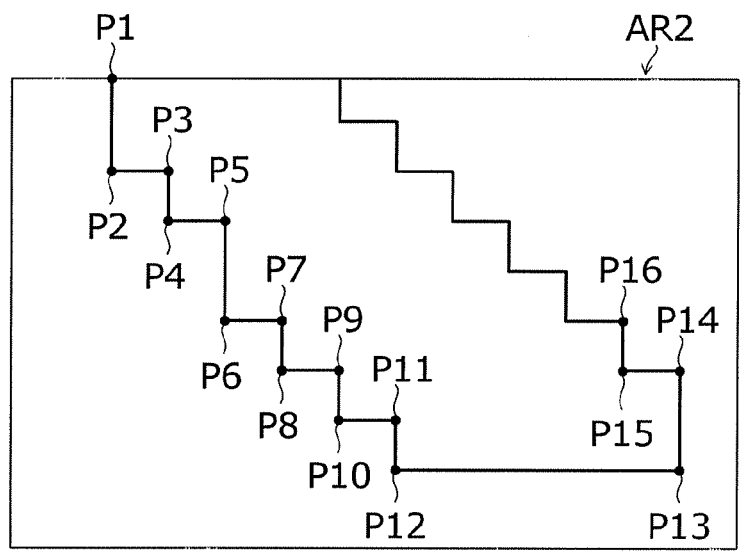
Figure 9C:
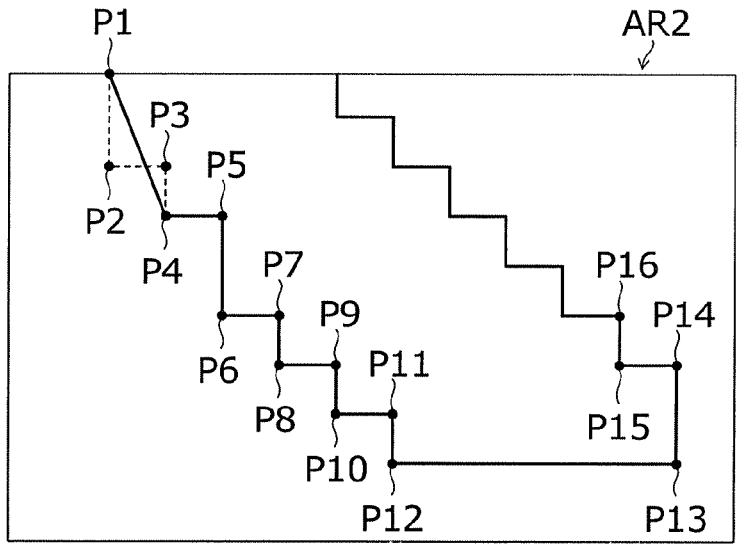
Figure 10A:
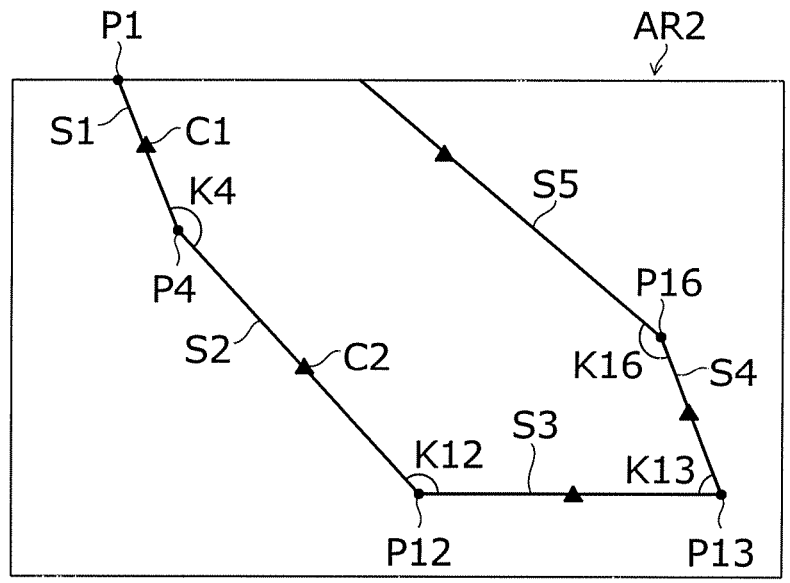
FIGS. 10A and 10B are diagrams illustrating a specific example of a selective curve approximation process.
Figure 10B:
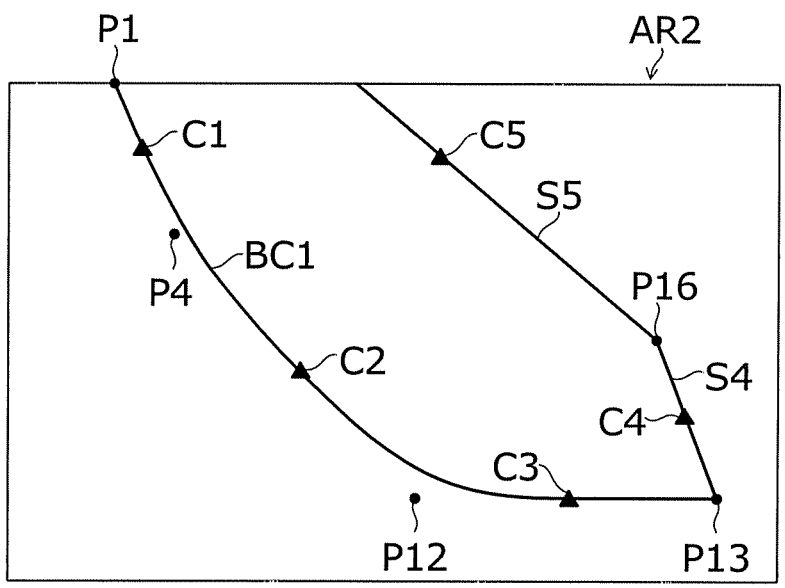
Figure 11:
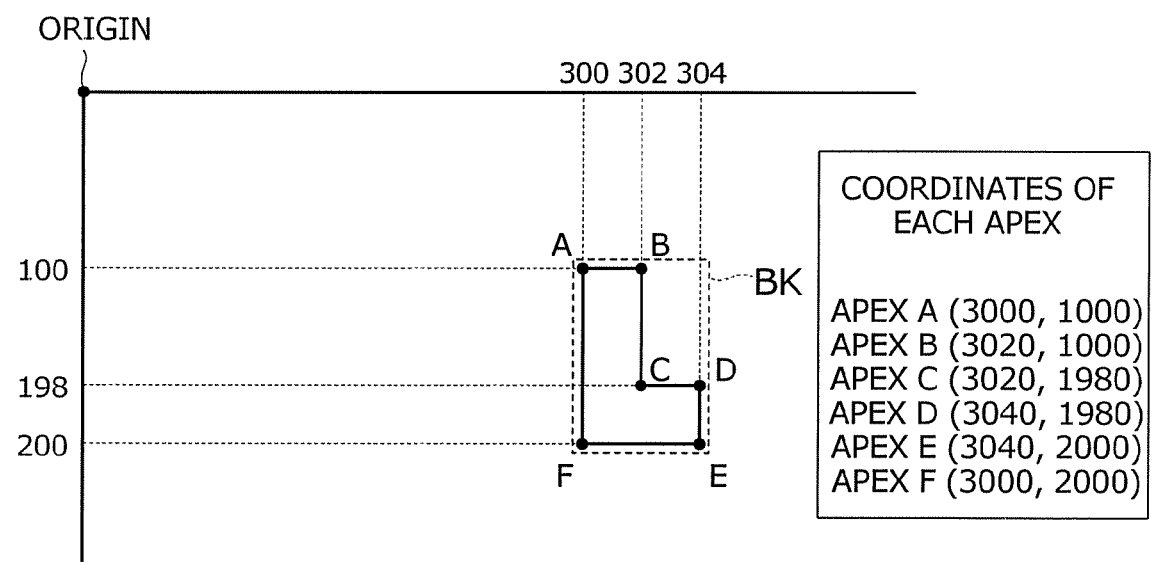
FIG. 11 is a diagram illustrating an example of a character expressed by binary character image data.
Figure 12A:
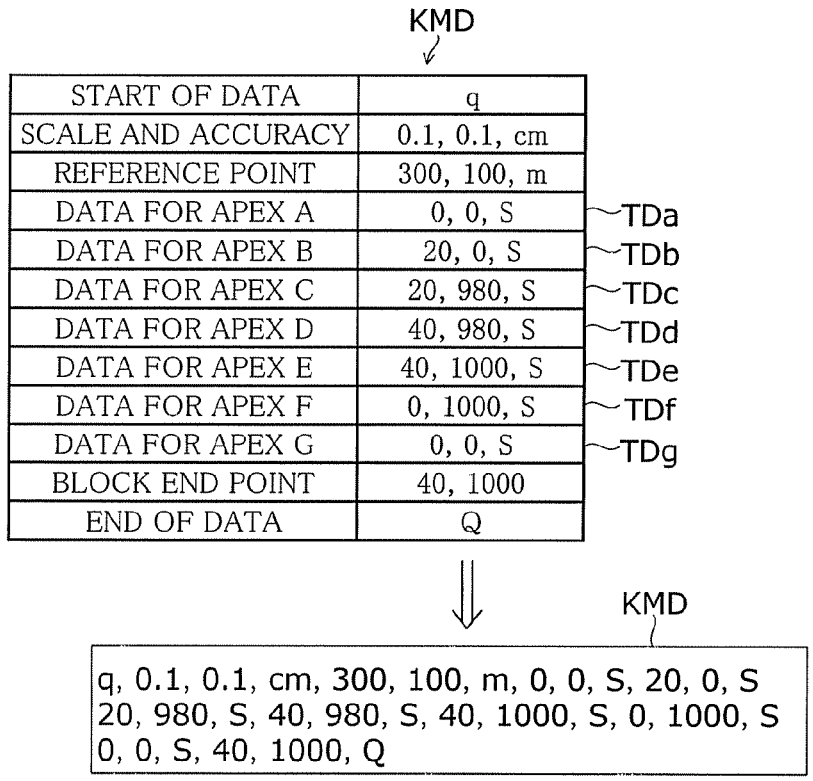
FIGS. 12A, 12B, and 12C are diagrams illustrating an example of a structure of block data that has undergone approximation processing.
Figure 12B:
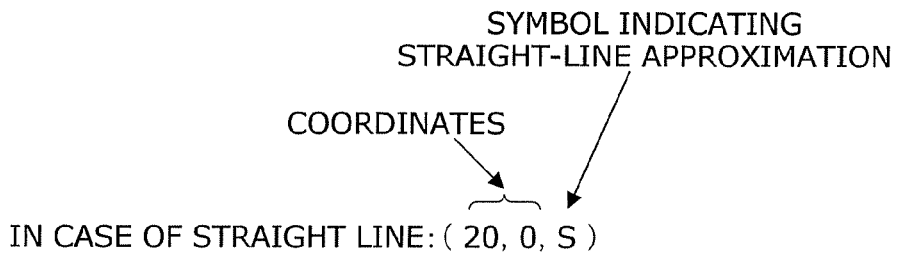
Figure 12C:
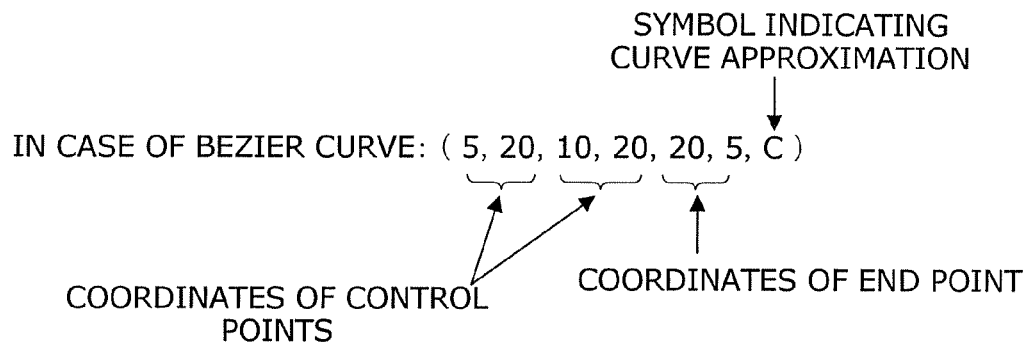

FIG. 4 is a diagram illustrating an example of a configuration of the outlining portion 14; FIGS. 5A and 5B are diagrams illustrating an example of characters expressed by binarized image data; FIG. 6 is a diagram illustrating an example of an image showing edges of a character; FIG. 7 is a diagram illustrating a pixel arrangement pattern TP for detecting apex pixels forming contours of a character; FIGS. 8A, 8B, and 8C are diagrams illustrating a specific example of apex pixel detection; FIGS. 9A, 9B, and 9C are diagrams illustrating a specific example of straight-line approximation; FIGS. 10A and 10B are diagrams illustrating a specific example of a selective curve approximation process; FIG. 11 is a diagram illustrating an example of a character expressed by binary character image data ND; FIGS. 12A, 12B, and 12C are diagrams illustrating an example of the structure of block data KMD that has undergone approximation processing; and FIGS. 13A and 13B are diagrams illustrating an example of block data KMD that has undergone approximation processing.

The outlining portion 14 is configured of a binarizing portion 101, a labeling portion 102, a complexity calculation portion 103, an approximation method determination portion 104, an apex detection portion 105, a straight-line approximation processing portion 106, a curve approximation processing portion 107, and so on.

The binarizing portion 101 binarizes the second character image data NG. In the binarization process, pixels with a darkness value greater than a binarization threshold value become dotted pixels (that is, black pixels), whereas pixels with a darkness value less than the binarization threshold value become non-dotted pixels (that is, white pixels). Through this, the character portions of the second character image data NG are expressed by black pixels, as shown in FIG. 5A. Hereinafter, the image data obtained by binarizing the second character image data NG shall be referred to as "binarized character image data ND".

The labeling portion 102 performs labeling on each character expressed in the binarized character image data ND. This process is carried out as follows.

Black pixel groups included in the binarized character image data ND, made up of black pixels connected to one another, are detected, and a block BK, which is a quadrangular region that encapsulate these black pixel groups, is defined. During this process, the black pixel groups located within a predetermined distance from each another are taken as black pixel groups that form a character, and these blocks BK encapsulating the black pixel groups are then grouped together to form a single block BK. Through this process, blocks BK1, BK2, . . . as shown in FIG. 5B are defined. Hereinafter, each of the blocks BK1, BK2, . . . may be collectively referred to as "block BK". Similarly, other devices or elements may be collectively referred to by omitting a serial number or an alphabetical letter added after a reference symbol. The block BK is defined based on the coordinates of the pixels at the top-left and bottom-right in the block BK by setting the position of the pixel in the top-left of the binarized character image data ND as the origin. Based on the coordinates of the top-left pixel, the position of the character corresponding to the block BK is identified, and, based on the coordinates of the top-left and bottom-right pixels, the vertical and horizontal lengths of the block BK, i.e., the size of the block BK, is identified. In the present embodiment, the size of the block BK is used as the size of the character included in that block BK.

The complexity calculation portion 103 performs a process for obtaining a degree of complexity that indicates the complexity of a character on each of the characters that have been subjected to the labeling process. This process will be described below. Here, the block BK1 is taken as an example.

The pixels that form edges of a character (edge pixels) shown in the block BK1 are detected by using a known edge detecting filter. With this arrangement, an image depicting edges of a character '人' as shown in FIG. 6 is obtained. The number of edge pixels is counted and memorized as a degree of complexity of the character '人'.

The approximation method determination portion 104 determines, in the following manner, the approximation method to be used on the contours of the characters based on the degrees of complexity that are obtained on the individual characters that have been subjected to the labeling process.

If the character is determined to have a certain degree of complexity, that is, if the degree of complexity of the character is larger than a predetermined threshold value (complexity determination threshold value), it is determined that straight-line approximation is to be used for the contours of the character rather than curve approximation. However, if the character is determined to have a degree of complexity which is not particularly large, that is, if the degree of complexity is equal to or smaller than the complexity determination threshold value, then it is determined that the curve approximation is to be used in addition to the straight-line approximation for the contours of the character.

The apex detection portion 105 detects pixels (apex pixels) in the apexes (changing points) of the characters within each block BK. This detection process is performed using apex detection patterns PT1 to PT8 shown in FIG. 7, which are patterns (arrangement patterns) of the arrangement of white and black pixels used for detecting apex pixels. In other words, the interior of the block BK is searched for a portion that matches one of the apex detection patterns PT1 to PT8 using pattern matching, and from the pixels in the matching portion, the pixel positioned at an apex position T in the matching apex detection pattern PT is detected as the apex pixel. Hereinafter, the process for detecting an apex pixel shall be described in detail with reference to FIGS. 8A, 8B, and 8C.

FIG. 8A indicates the block BK1 encapsulating the character '人' included in the binarized character image data ND. FIG. 8B is an enlarged diagram of a specific portion within the block BK (specific portion AR1).

Regarding this specific portion AR1, when the interior of the specific portion AR1 is scanned seqcientially starting with the top-left pixel, an arrangement pattern that matches the apex detection pattern PT1 is detected in the part with a pixel group AH. In the pixel group AH, a pixel GS22, located in the apex position T of the apex detection pattern PT1, is detected as an apex pixel. Carrying out this apex pixel detection results in the detection of pixels GS23, GS43, GS53, GS18, and GS28 as apex pixels as well.

By connecting the detected apex pixels with a line segment, an image indicating the contours of the character '人" illustrated in FIG. 8C, can be generated.

The straight-line approximation processing portion 106 performs straight-line approximation on the contours of each character included in the binarized character image data ND. In the present embodiment, straight-line approximation is performed by approximating a character contour formed by three or more apexes to a line segment (approximation line segment) connecting two apexes. This straight-line approximation is performed over the entire contour of the character. The procedure for the straight-line approximation shall now be described in detail with reference to FIGS. 9A, 9B, and 9C.

FIG. 9A illustrates an image representing the contour of the character '人". This image is rendered by connecting the centers of the apex pixels found by the apex detection portion 105 to one another using line segments. FIG. 9B illustrates an enlarged view of a specific portion (specific portion AR2) within the image representing the contour in FIG. 9A.

First, an arbitrary apex is selected as a starting point in the specific portion AR2. Here, it is assumed that an apex P1 has been selected as the starting point. The starting point P1, and an apex P3 that is two spaces away from the starting point P1 and that serves as a candidate (end point candidate) for the end point of an approximation line segment, are then selected. The distance from the segment connecting the starting point P1 and the apex P3 of the end point candidate (end point candidate apex) to an apex P2 that is an apex lying between the starting point P1 and the end point candidate apex P3 is then found. It is then checked whether or not the distance that has been found is less than a predetermined threshold value (straight-line approximation threshold value). In the case where the distance is less, the end point candidate shifts to the next apex, i.e., an apex P4, and the same process is repeated. In other words, the distances from the line segment connecting between the starting point P1 and the end point candidate P4 to the apexes that lie between the starting point P1 and the end point candidate P4, i.e., the apexes P2 and P3, are found. It is then checked whether or not the distances that have been found are less than a predetermined threshold value (the straight-line approximation threshold value). In the case where both distances are less than the straight-line approximation threshold value, the end point candidate shifts to the next apex, i.e., apex P5, and the same process is repeated.

The end point candidate apex is sequentially shifted to the next apex until an end point candidate for which any of the distances from the line segment connecting the starting point with the end point candidate to the apexes that lie between the starting point and the apex of the end point candidate are greater than the straight-line approximation threshold value appears. The end point of the approximation line segment is determined upon one of those distances being greater than the straight-line approximation threshold. The example in FIG. 9B assumes that when an apex P5 is taken as the end point candidate, the distance from the line segment connecting the starting point P1 with the end point candidate P5 to an apex P2 is greater than the straight-line approximation threshold value.

When the end point candidate has been shifted to the apex P5, the distances from a line segment connecting the starting point P1 with the end point candidate apex P5 to the individual apexes that lie between the starting point P1 and the end point candidate apex P5 are found in the same manner. The distance from that line segment and the apex P2 is greater than the straight-line approximation threshold value, and therefore the end point of the approximation line segment whose starting point is the apex P1 is determined at this time. The end point is determined to be the apex one previous to the current end point candidate. In the example shown in FIG. 9B, the apex P4, which is one previous to the end point candidate apex P5, is determined to be the end point. Then, the apexes P1 and P4 are recorded as the starting point and the end point, respectively, so that the contour formed by the apexes P1, P2, P3, and P4 is approximated by a line segment S14 connecting the starting point P1 with the end point P4, as shown in FIG. 9C.

When the end point has been determined, that end point is then used as the starting point of the next approximation line segment, and a process for finding that next approximation line segment is then performed. In other words, the apex P4 is taken as the starting point, and an apex two spaces away therefrom, i.e., an apex P6, is taken as an end point candidate; the distances from a line segment that connects the starting point P4 with the end point candidate apex P6 to the apexes that lie between the starting point P4 and the end point candidate P6 are then found. The end point candidate is shifted and the end point is determined using the same method as has already been described. This process is repeated, and the starting points and end points of the approximation line segments are found for all contours of the character.

Using the above method, the straight-line approximation processing portion 106 performs straight-line approximation on the contours of the characters in all the blocks BK detected through labeling, and outputs approximation-processed block data KMD representing the characters that have been subjected to the straight-line approximation for each block BK. Details of the approximation-processed block data KMD shall be given later.

The curve approximation processing portion 107 performs a curve approximation process (selective curve approximation process) on portions of the contours of the characters in the blocks BK whose character contours have been determined to be approximated using curve approximation in addition to the straight-line approximation, the process being performed on portions that fulfill a predetermined condition. The curve approximation is performed on the contours of the post-straight-line approximation characters represented by the approximation-processed block data KMD.

In the present embodiment, when two adjacent approximation line segments, from among all the approximation line segments that form character contours, fulfill the following conditions (1) and (2) at the same time, the contour expressed by those two approximation line segments is approximated by a Bezier curve.
(1) Both of the two approximation line segments are shorter than a predetermined length (curve approximation threshold value).
(2) The lesser angle formed at the intersection of the two approximation line segments (judgment target angle) is greater than a predetermined angle (approximation threshold angle).

Detailed descriptions of the selective curve approximation process shall now be given with reference to FIGS. 10A and 10B.

FIG. 10A illustrates a contour of the character "人" within a specific portion AR2, formed by approximation line segments S1 to S5. In the example shown in FIG. 10A, judgment target angles K4, K12, and K16 are assumed to be greater than the approximation threshold angle, whereas a judgment target angles K13 is assumed to be smaller than the approximation threshold angle. Furthermore, the lengths of approximation line segments S1, S2, S3, and S4 are assumed to be smaller than the curve approximation threshold value, whereas the approximation line segment S5 is assumed to be greater than the curve approximation threshold value.

In FIG. 10A, regarding the approximation line segments S1 and S2, the lengths of these approximation line segments S1 and S2 are both smaller than the curve approximation threshold value, and thus fulfill the above condition (1). Furthermore, the judgment target angle K4 is greater than the approximation threshold angle and thus fulfills the above condition (2). In other words, the approximation line segments S1 and S2 fulfill both the above conditions (1) and (2), and thus curve approximation is performed on the contour of these approximation line segments. The curve approximation is performed, for example, as follows.

First, midpoints C1 and C2 are found for the approximation line segments S1 and S2, respectively. The midpoints C1 and C2 are then taken as a starting point and an ending point, respectively, and two other control points are then determined in accordance with a predetermined rule; a Bezier curve BC1 as shown in FIG. 10B is then found. The two control points are assumed to be points for drawing a Bezier curve that make contact with the approximation line segment S1 at the midpoint C1 and the approximation line segment S2 at the midpoint C2. For example, the midpoint between the apex P4 and the midpoint C1, and the midpoint between the apex P4 and the midpoint C2, may be taken as the control points. The control points may also be determined to be points based upon which the Bezier curve comes as close as possible to the apex P4.

Next, the approximation line segments S2 and S3 shall be discussed. Because these line segments fulfill both the above conditions (1) and (2), the approximation is therefore performed on the contour of these approximation line segments in a similar manner.

Then, the approximation line segments S3 and S4 shall be discussed. Because the judgment target angle K13 of these approximation line segments is smaller than the approximation threshold angle, it does not fulfill the above condition (2). The curve approximation is therefore not performed on this pair of approximation line segments.

Next, the approximation line segments S4 and S5 shall be discussed. Because the length of the approximation line segment S5 is greater than the curve approximation threshold value, it does not fulfill the above condition (1). The curve approximation is therefore not performed on this pair of approximation line segments.

Such a process is performed on each pair of adjacent approximation line segments, and the curve approximation is performed on pairs thereof that fulfill the above conditions (1) and (2). When such a process is performed on the example shown in FIG. 10A, a contour such as that shown in FIG. 10B is obtained.

The curve approximation processing portion 107 uses such a method to perform the selective curve approximation process on the contours of the characters represented by all instances of the approximation-processed block data KMD obtained from the straight-line approximation processing portion 106, thereby converting the approximation-processed block data KMD into data representing post-selective curve approximation process characters. In addition, vector character image data VD, which is image data in vector format representing those characters, is generated using the approximation-processed block data KMD of the characters that have been subjected to labeling. The vector character image data VD is then outputted to the compressed data generation portion 15. Details regarding the approximation-processed block data KMD shall be provided with reference to FIGS. 11 to 13B.

FIG. 11 illustrates an image including the character "L". The contours of this character "L" are expressed by approximation line segments connecting apexes A, B, C, D, E, and F to one another. When the top-left of the image is taken as the origin, the coordinates of the apexes A, B, C, D, E, and F are as denoted in FIG. 11.

As shown in FIG. 12A, the approximation-processed block data KMD of the block BK shown in FIG. 11 includes a symbol "q" indicating the start of the approximation-processed block data KMD of that block BK, the scale and accuracy, the coordinates of a reference point, apex data TD for apexes A through G, the coordinates of the bottom-right point of that block BK (block end point), and a symbol "Q" indicating the end of the approximation-processed block data KMD of that block BK. The reference point is the top-left point of that block BK.

As shown in FIG. 12B, when an apex is the end point of a line segment resulting from straight-line approximation, the apex data TD indicates the coordinates of that apex relative to the reference point serving as the origin, and a symbol "S" indicating straight-line approximation.

For example, apex data TDc for the apex C indicates "20, 980, S". "S" indicates straight-line approximation, meaning that the character contour is approximated by an approximation line segment that connects the apex B, which is the apex immediately prior to the apex C, with the apex C. In other words, assuming the reference point is used as the origin, this means that the contour is drawn and reproduced by an approximation line segment that connects the apex B whose coordinates are (20, 0) with the apex C whose coordinates are (20, 980).

Meanwhile, in the case of curve approximation, the apex data TD indicates the coordinates of two control points, the coordinates of the end point, and the symbol "C" indicating curve approximation, as shown in FIG. 12C. This means that, in the example shown in FIG. 12B, assuming the reference point is used as the origin, the character contours are approximated by finding a Bezier curve in which points whose coordinates are (5, 20) and (10, 20) are used as the control points, the point whose coordinates are (20, 5) is used as the end point, and the point immediately prior to the apex of this apex data TD (the end point of the approximation line segment immediately previous, when the previous approximation method is straight-line approximation, or the end point of the Bezier curve immediately previous, when the previous approximation method is curve approximation) is used as the starting point.

FIG. 13A illustrates the approximation-processed block data KMD of a block BK generated by performing straight-line approximation. When selective curve approximation process is further performed on the character contours reproduced by this approximation-processed block data KMD, the approximation-processed block data KMD is updated to that shown in FIG. 13B. The underlined portions in FIG. 13B are the apex data TD of the apexes of portions of contours expressed through curve approximation. As can be seen in the example in FIGS. 13A and 13B, performing curve approximation increases the amount of the apex data TD, and therefore the overall size of the approximation-processed block data KMD increases as well.

Figure 14:
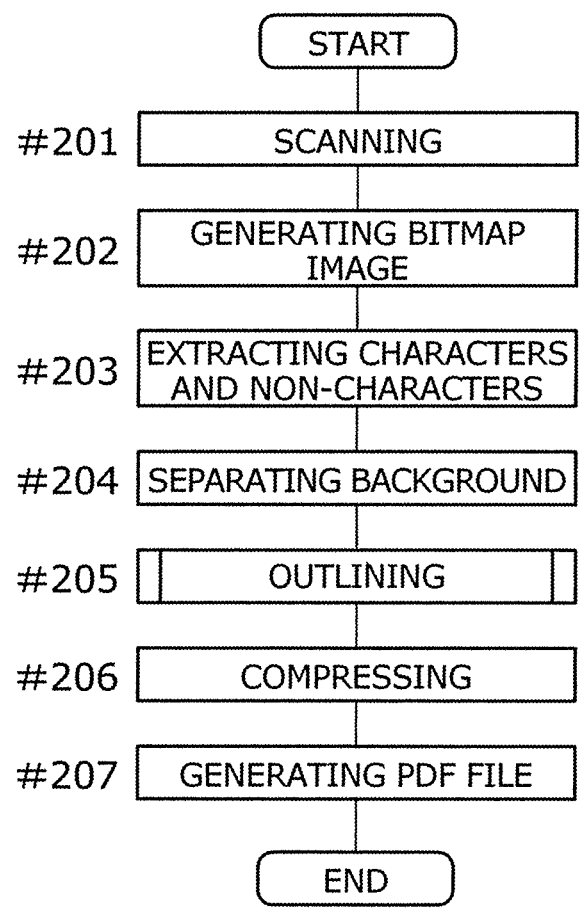
FIG. 14 is a flowchart illustrating an overall flow of processing performed by the image forming apparatus when converting scanned image data into a PDF file.
Figure 15:
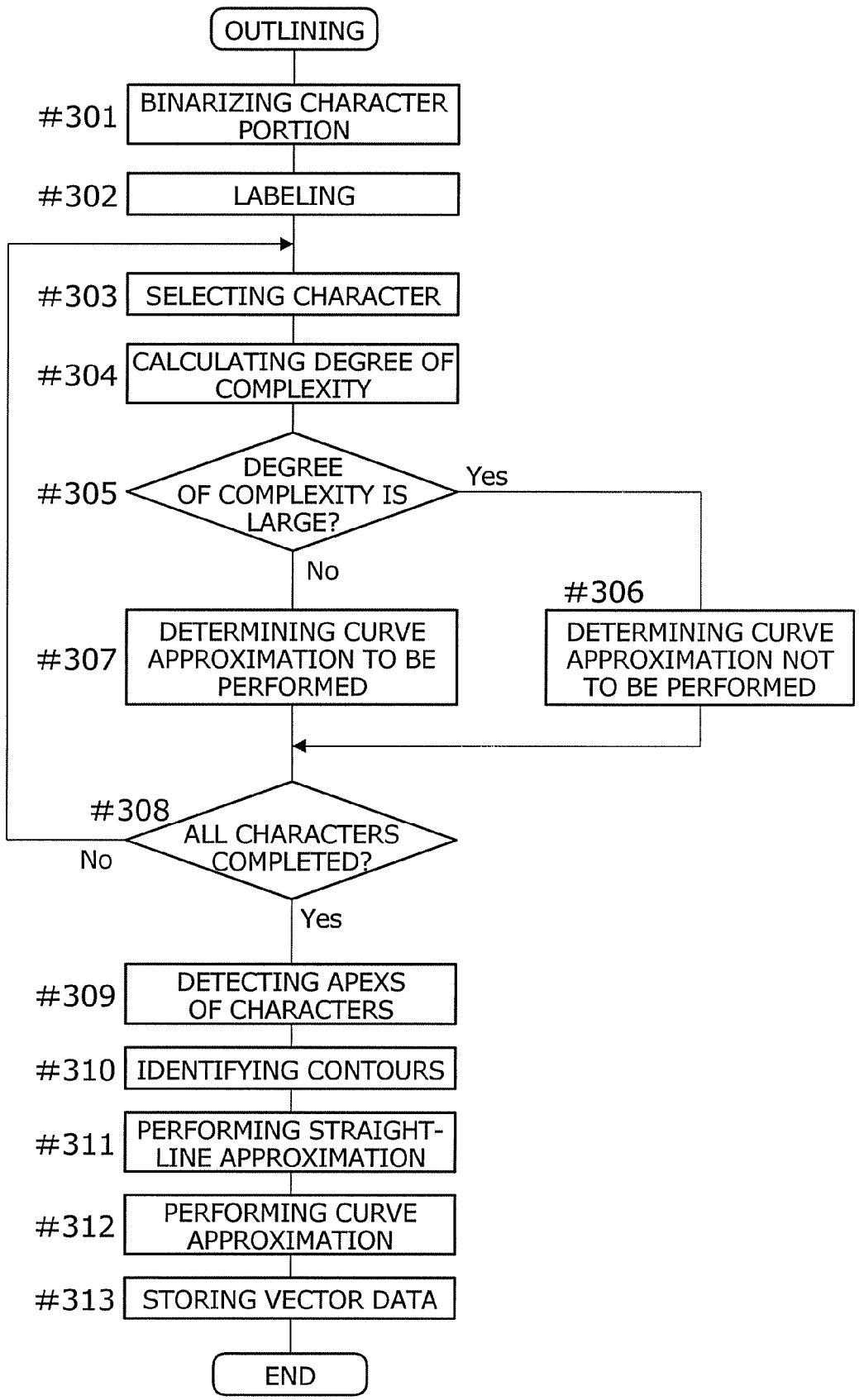
FIG. 15 is a flowchart illustrating a flow of an outlining process.
Figure 16A:
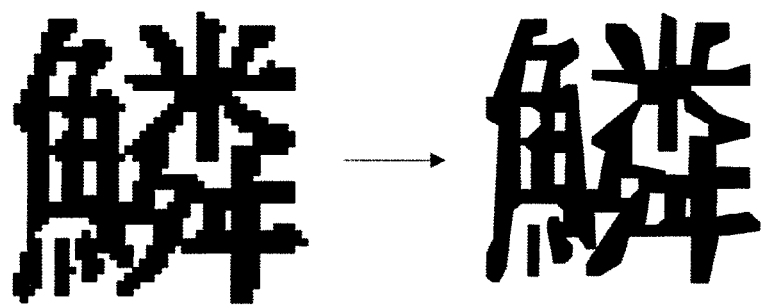
FIGS. 16A and 16B are diagrams illustrating an example of results obtained when an outlining process according to an embodiment of the present invention is performed on a character having a relatively complex shape and a character having a relatively simple shape, respectively.
Figure 16B:
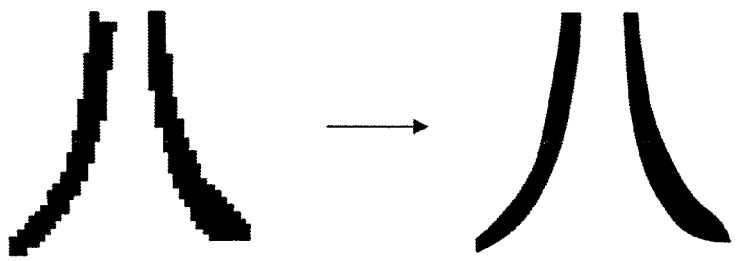

FIG. 14 is a flowchart illustrating the flow of processing performed by the image forming apparatus 1 when converting scanned image data into a PDF file. FIG. 15 is a flowchart illustrating the flow of an outlining process. FIGS. 16A and 16B are diagrams illustrating an example of results obtained when the outlining process according to the present embodiment is carried out on a character having a relatively complex shape and a character having a relatively simple shape.

In FIG. 14, the user sets a document GK in the scanner 10a, and specifies the PDF file format as the storage format. When the user inputs a command to execute the scan, the image forming apparatus 1 scans the document GK (#201), thereby generating raster format document image data GD expressing an image of the document GK (#202). Using the generated raster format document image data GD, the image forming apparatus 1 generates a PDF file in the following manner.

First, portions with characters and portions with non-character objects HO are extracted from the document image data GD (#203). The background is then eliminated from the first character image data MG, which expresses the extracted characters with the non-character objects HO having been left out (#204). The outlining process according to the present embodiment is then performed on the second character image data NG, expressing the extracted characters with the background having been eliminated (#205).

In the outlining process, the second character image data NG is first binarized (#301 in FIG. 15). The labeling process is then performed on the binarized character image data ND obtained through the binarization, and the blocks BK encapsulating the characters included in the binarized character image data are obtained (#302). The approximation method to be used when converting the labeled characters into vector format is then determined. This determination is performed as follows.

First, a single labeled character is selected (#303). The degree of complexity of that character (the selected character) is then found (#304). It is then checked whether or not that the degree of complexity is less than a predetermined complexity determination threshold value.

In the case where the degree of complexity of the selected character is greater than the complexity determination threshold value (Yes in #305), it is determined that the curve approximation process is not to be performed on that selected character (#306).

However, in the case where the degree of complexity of the selected character is not greater than the complexity determination threshold value (No in #305), it is determined that the curve approximation process is to be performed on that selected character (#307).

The processes of steps #303 to #307 are then performed on all characters that have been labeled (No in #308).

When the processes of steps #303 to #307 have been performed on all characters that have been labeled (Yes in #308), the apexes of each character are detected (#309), and the contours of the characters are identified (#310). Further, the contours of the characters then undergo straight-line approximation (#311).

After the straight-line approximation, the selective curve approximation process, described earlier, is performed on the characters for which it has been determined in #307 that curve approximation is to be performed (#312).

The binarized character image data NG is converted from raster format to vector format through the above process, and the resulting vector character image data VD in vector format is then stored (#313).

In other words, according to the outlining process in step #205, characters having relatively complex shapes undergo approximation on their contours using only straight-line approximation, without using curve approximation. Contours of the characters having relatively complex shapes are thus drawn with straight lines, as shown in FIG. 16A. However, the characters having relatively simple shapes undergo approximation on their contours using straight-line approximation and curve approximation. Contours of the characters having relatively simple shapes are thus drawn with both straight lines and curves, as shown in FIG. 16B.

The stored vector character image data VD is compressed using a lossless compression technique, whereas the images of the background image data KG and non-character objects HO are compressed using a lossy compression technique after being converted to low resolution (#206 in FIG. 14). Then, a PDF file is generated using the respective pieces of compressed data (#207).

Figures 17A, 17B:
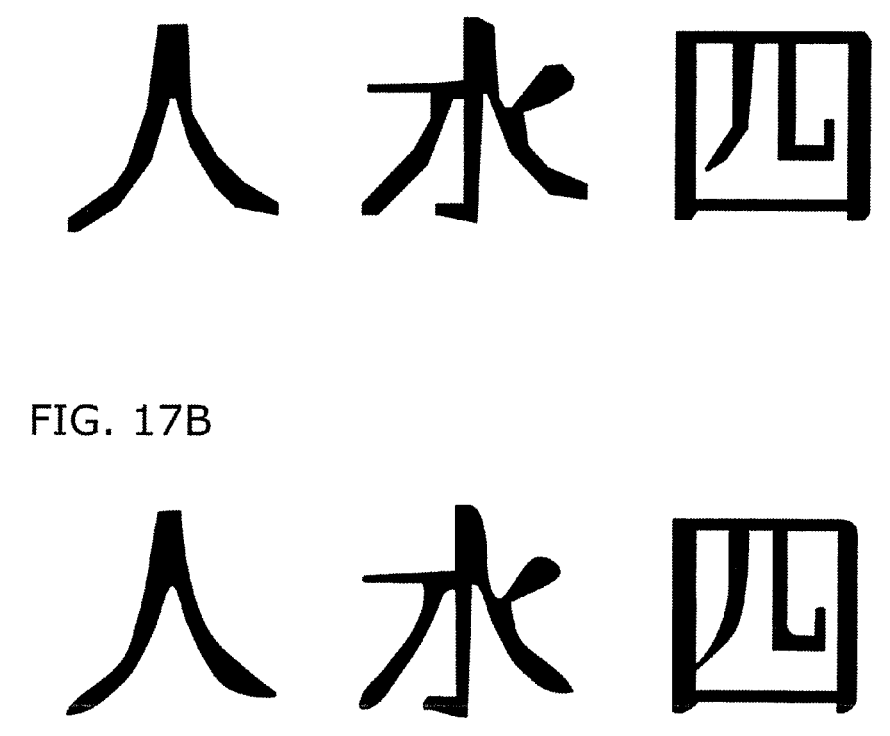
Figure 18A:
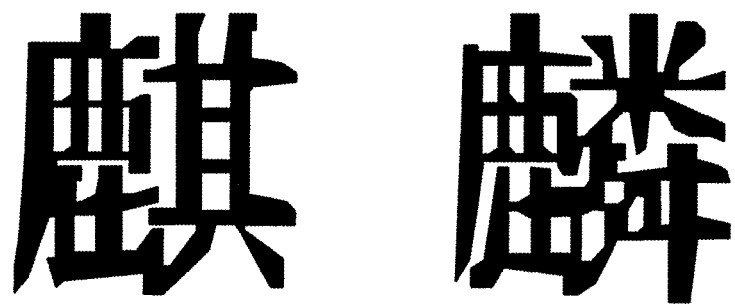
FIGS. 18A and 18B are diagrams illustrating an example of results obtained when an outlining process according to an embodiment of the present invention is carried out on characters having relatively complex shapes.
Figure 18B:
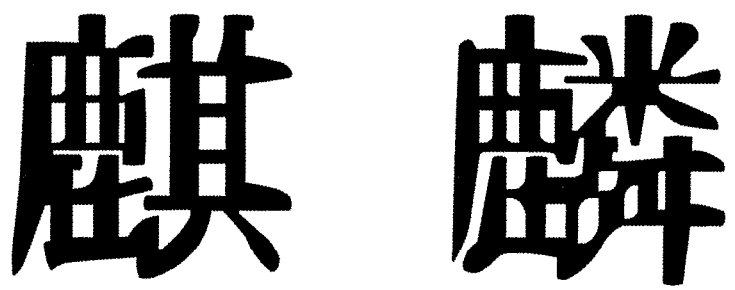
Figure 19:
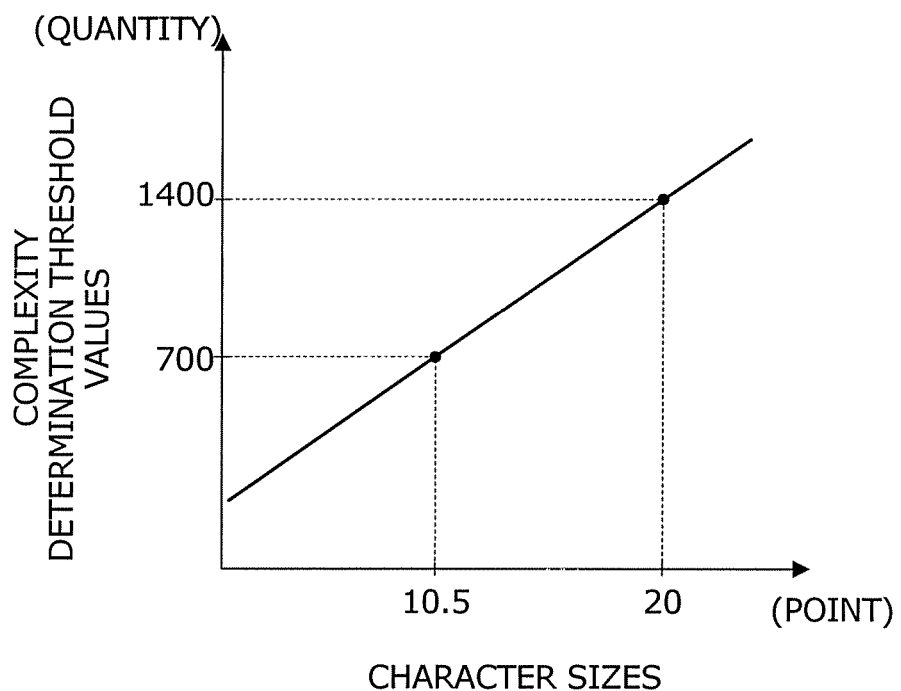
FIG. 19 is a diagram illustrating a relationship between character sizes and complexity determination threshold values.

FIGS. 17A and 17B are diagrams illustrating an example of results obtained when the outlining process according to the present embodiment is carried out on characters having relatively simple shapes, whereas FIGS. 18A and 18B are diagrams illustrating an example of results obtained when the outlining process according to the present embodiment is carried out on characters having relatively complex shapes. FIG. 19 is a diagram illustrating a relationship between character sizes and complexity determination threshold values.

FIGS. 17A and 18A illustrate examples in which straight-line approximation has been performed on respective characters. FIGS. 17B and 18B, meanwhile, illustrate examples of the result of performing the selective curve approximation process on the contours of each of the characters shown in FIGS. 17A and 18A that have undergone the straight-line approximation.

As seen in FIG. 17A, when approximation is performed on the character contours using only straight-line approximation, without using curve approximation, angles arise in curved portions of the character contours, leading to angular characters. Consequently, the shapes of such characters appears unnatural. Such unnaturalness is particularly marked in characters having relatively simple shapes as shown in FIG. 17A, thereby leading to apparent degradation of image quality. Therefore, the selective curve approximation process is performed on the character contours that have undergone the straight-line approximation. Doing so makes it possible to obtain character contours such as those shown in FIG. 17B.

However, as can be seen by comparing FIGS. 18A and 18B, when the shapes of the characters are relatively complex, there is no marked difference in appearance regardless of whether or not curve approximation is used. Therefore, it can be said that it is desirable to use curve approximation particularly in the case where the shapes of the characters are simple in order to reduce image quality degradation.

According to the present embodiment, curve approximation, the use of which results in a large amount of data after the approximation, is not used on characters having complex shapes for which almost no difference is apparent between straight-line approximation and curve approximation. It is therefore possible to reduce the post-approximation data amount to a greater extent than with the conventional method that uses curve approximation unconditionally even on characters having complex shapes. Furthermore, because curve approximation, which involves a large amount of processing, can be favorably reduced, the efficiency of the process can be improved. Finally, because curve approximation is performed on characters having relatively simple shapes at which angularity in the contours is apparent after using straight-line approximation, the above-mentioned effects can be achieved while causing almost no degradation in image quality, as compared to the conventional method.

Although the degree of complexity is defined by the number of edge pixels in the block BK in the present embodiment, it may be defined by the size (vertical length×horizontal length) of the block BK, that is, a ratio of the number of edge pixels to a total number pixels in the block BL. Alternatively, it is also possible to use a boundary length of a character (a length of contour lines) as the degree of complexity.

Although a single value is used as the complexity determination threshold value regardless of the character size in the present embodiment, it is also possible to arrange such that the threshold value varies in accordance with the character size. In such a case, the relationship between the character sizes and the complexity determination threshold values is defined in advance in such a way that, as the character size becomes larger, the complexity determination threshold value becomes larger. In the example in FIG. 19, the horizontal axis shows the character sizes (in points), and the vertical axis shows the complexity determination threshold values. When the approximation method is determined by the approximation method determination portion 104, a complexity determination threshold value, corresponding to a character size for which the approximation method is determined, is first obtained based on the relationship shown in FIG. 19. Then, the approximation method is determined by using the complexity determination threshold value thus obtained in a manner as previously described. In the case of a character having a relatively complex shape, angularity in the contours is less apparent even if that character undergoes straight-line approximation as described previously with reference to FIGS. 18A and 18B. However, when the character size becomes larger, the angularity becomes more apparent than when the character size is smaller even for such a character having a complex shape. Therefore, as described above, curve approximation is appropriately used when the character size is large enough to be determined that the angularity becomes apparent even for such a character having a complex shape, by arranging such a way that, as the character size becomes larger, the complexity determination threshold value becomes larger. With this arrangement, generation of such angularity can be suppressed.

Although image data scanned by the scanner 10a is used in the present embodiment, image data received by the network interface 10h from another device may also be used.

Furthermore, although binarization is performed by the binarizing unit 101 based on the darkness value in the present embodiment, this process may instead be performed based on the brightness. In such a case, for example, pixels whose brightnesses are greater than a predetermined threshold value are taken as white pixels, whereas pixels whose brightnesses are lower than the predetermined threshold value are taken as black pixels.

Part of the functions of the various portions in FIG. 2 or 4 may be implemented as hardware. For example, the image forming apparatus 1 may be provided with hardware such as an input image processing portion and an output image processing portion. The input image processing portion accepts the document image data GD from the scanner 10a, and performs processes such as color conversion, color correction, resolution conversion, and region determination. The output image processing portion performs processes such as screen control, smoothing, and PWM control. The processed data is then stored in the hard disk 10c, the RAM 10d, the ROM 10e, or the like.

Note that the methods of straight-line approximation and curve approximation are not intended to be limited to those discussed in the present embodiment, and various other methods may be used as well.

Also note that the edges of the character may be defined by a width equivalent to a single pixel or a width equivalent to two or more pixels.

Finally, the configuration and functions of all or part of the image forming apparatus 1, the details or order of the processing performed thereby, the details of the various pieces of data, and so on can be modified in various ways within the spirit of the present invention.

What is claimed is:

1. An image processing apparatus comprising:
    a character extraction portion extracting a character from raster image data;
    a complexity calculation portion obtaining a degree of complexity indicating complexity of the character;
    a determination portion determining, based on the degree of complexity obtained by the complexity calculation portion, whether or not curve approximation is to be used when the character is converted from a raster format to a vector format; and
    an image conversion portion converting, when the determination portion determines that the curve approximation is to be used, the character from the raster format to the vector format by performing straight-line approximation or the curve approximation on each part of a contour of the character, and converting, when the determination portion determines that the curve approximation is not to be used, the character from the raster format to the vector format by performing the straight-line approximation on each part of the contour of the character without performing the curve approximation thereon,
    wherein the complexity calculation portion obtains, as the degree of complexity, a ratio of a number of edge pixels that are pixels forming edges of the character to a value that indicates a size of the character, and
    wherein the determination portion determines that the curve approximation is not to be used when the degree of complexity obtained by the complexity calculation portion is equivalent to a value that indicates more complexity than predetermined complexity.

2. The image processing apparatus according to claim 1, further comprising a compression portion generating compressed data by performing lossless compression on the character thus converted to the vector format and performing lossy compression on a part other than the character included in the raster image data.

3. An image conversion method for converting image data from a raster format to a vector format, the method comprising the steps of:
    extracting a character from the image data in the raster format;
    obtaining a degree of complexity indicating complexity of the character;
    determining, based on the degree of complexity thus obtained, whether or not curve approximation is to be used when the character is converted from the raster format to the vector format;
    converting, when it is determined that the curve approximation is to be used, the character from the raster format to the vector format by performing straight-line approximation or the curve approximation on each part of a contour of the character; and converting, when it is determined that the curve approximation is not to be used, the character from the raster format to the vector format by performing the straight-line approximation on each part of the contour of the character without performing the curve approximation thereon, wherein the obtained degree of complexity is a ratio of a number of edge pixels that are pixels forming edges of the character to a value that indicates a size of the character, and wherein it is determined that the curve approximation is not to be used when the degree of complexity thus obtained is equivalent to a value that indicates more complexity than predetermined complexity.

4. The image conversion method according to claim 3, further comprising generating compressed data by performing lossless compression on the character thus converted to the vector format and performing lossy compression on a part other than the character included in the raster image data.

5. A non-transitory computer-readable storage medium storing thereon a computer program executed by a computer that converts image data from a raster format to a vector format, the computer program causing the computer to perform:

extracting a character from the image data in the raster format;

obtaining a degree of complexity indicating complexity of the character;

determining, based on the degree of complexity thus obtained, whether or not curve approximation is to be used when the character is converted from the raster format to the vector format;

converting, when it is determined that the curve approximation is to be used, the character from the raster format to the vector format by performing straight-line approximation or the curve approximation on each part of a contour of the character; and converting, when it is determined that the curve approximation is not to be used, the character from the raster format to the vector format by performing the straight-line approximation on each part of the contour of the character without performing the curve approximation thereon, wherein the obtained degree of complexity is a ratio of a number of edge pixels that are pixels forming edges of the character to a value that indicates a size of the character, and wherein it is determined that the curve approximation is not to be used when the degree of complexity thus obtained is equivalent to a value that indicates more complexity than predetermined complexity.

6. The non-transitory computer-readable storage medium according to claim 5, wherein the computer program causes the computer to further perform generating compressed data by performing lossless compression on the character thus converted to the vector format and performing lossy compression on a part other than the character included in the raster image data.

* * * * *